United States Patent [19]

Müller

[11] 4,327,478

[45] May 4, 1982

[54] PROCESS FOR FORMING THE WINDING CORES OF STATORS OR ROTORS OF ELECTRIC MACHINES

[75] Inventor: Josef Müller, Frankfurt am Main, Fed. Rep. of Germany

[73] Assignee: Balzer & Droll, Niederdorfelden, Fed. Rep. of Germany

[21] Appl. No.: 49,305

[22] Filed: Jun. 18, 1979

[30] Foreign Application Priority Data

Jun. 21, 1978 [DE] Fed. Rep. of Germany ....... 2827139

[51] Int. Cl.³ .......................................... H02K 15/08
[52] U.S. Cl. ...................................... 29/596; 29/564; 29/598; 29/736
[58] Field of Search ................. 29/596, 598, 732, 736, 29/564; 112/121.2; 72/DIG. 2; 11/11

[56] References Cited

U.S. PATENT DOCUMENTS 3,862,493  1/1975  Habegger et al. ............... 29/596 X
3,874,056  4/1975  Peters ................................... 29/736
3,913,373  10/1975 Kindig .............................. 29/596 X Primary Examiner—Carl E. Hall
Attorney, Agent, or Firm—Larson and Taylor

[57] ABSTRACT

A process and device for forming the winding core of a stator or rotor. The winding core is only partially exposed to shaping pressure. Shaping is then continued progressively over the core periphery. A device for effecting the method includes a single or multipartite pressing tool for the winding core. The tool is rotatable relative to the long axis of a stator or rotor. In a preferred embodiment, the tool has a narrow shaping part positioned adjacent to a wrapping tool used to provide a wrapping about the shaped coil.

7 Claims, 6 Drawing Figures

PROCESS FOR FORMING THE WINDING CORES OF STATORS OR ROTORS OF ELECTRIC MACHINES

The invention concerns a process for forming the winding cores also called winding heads of stators or rotors of electric machines, as well as a heads, also referred to in this specification as winding device for execution of the said process.

There are various processes for fastening the winding heads or cores, and in this way protecting them against damage. One of the conventional methods is "lacing" whereby the winding cores are manually or mechanically bound firmly together by looping cotton strips, fiberglass strips, cords or the like around them. In the mechanized production of motors, the customary process usually includes preshaping of the windings pulled into a stator in the region of the winding cores that project at the front beyond the stator sheet pack, lacing them, and finally straightening the laced winding cores precisely, in a second pressing or shaping step.

In the known processes and devices, the winding cores are subjected to effective pressure simultaneously, over the whole periphery, by annular tools. There is the drawback associated with this, that the shaping forces that are to be applied and to be received by the machine construction are relatively great. Another disadvantage is that the shaping and lacing processes occur in succession. The preshaped winding cores then partly jump up because of their intrinsic elasticity, before they are laced and then they cannot be tied firmly and they loosen still more with the after-shaping in the lacings, so that during later operation of the motor, intrinsic motions and oscillations of individual wires that may occur can then lead to fracture.

The invention is intended to develop a process and a device suitable for its execution, by means of which the winding cores can be shaped with less force. To solve this problem, it is proposed that the winding cores be only partly exposed to shaping pressure, and progressively shaped over the periphery.

Since, according to the process of the invention, greater pressure is exerted only on a small place, the forces to be utilized are slight, whereas the pressing effect is very good.

Although in principle the new process can be applied in all cases in which winding cores are preshaped and/or finally shaped, whether in a specal work step or in direct temporal connection with a work step that fastens the winding cores, in a preferred embodiment of the invention, the winding cores will be laced during shaping, whereby advantageously they are only shaped close the lacing station, and therewith progressively shaped by strong pressure. In this way, it is ensured that the wire in the winding core cannot work loose between the shaping and the lacings.

In a further preferred embodiment of the process of the invention, the winding cores are pressed together with strong pressure only just upstream of the lacing station. Downstream of the lacing station, they are held by the lacings.

In the present process, it is possible in most cases to do without any further forming processes.

A device is proposed for carrying out the process according to the invention, which has a single or multipartite pressing tool for the winding cores. The tool is rotatable relative to the long axis of the stator or rotor, and in a preferred arrangement, it has a narrow shaping part immediately next to a lacing tool, the narrow shaping part being progressively movable with the tool relative to a winding undergoing a shaping process.

The above expression "narrow shaping part" means a shaping part that is no wider than necessary in view of considerations of strength, wear, possibility for attachment, and other technological factors, to compress the winding cores in the region where the lacing tools work.

The shaping part can have an essentially U-shaped profile in a radial sectional plane with reference to the stator or rotor. However, in an alternative embodiment, it may comprise one or more rolls that press radially and/or axially against the winding core. In a further practical modification of the concept of the invention, the shaping part may also be made like tongs or in another suitable way, so that it can be varied in cross-section in a radial plane of the stator or rotor.

To prevent the winding cores from being pressed so closely against the front face of the stator sheet pack by axial shaping pressure or possibly by axial pressure combined with radial shaping pressure, that the lacing tool will be unable to be introduced between the winding cores and the stator sheet pack, in a preferred embodiment of the invention, it may be provided that the shaping part will cooperate with supporting members that can be introduced between the winding cores and the front of the stator or rotor, which supporting members will retain a specific separation between the winding cores and the front of the stator or rotor. The said supporting members can be nose-shaped or tongue-shaped projections, on a retaining device of the stator sheet pack.

The proposed shaping part is advantageously placed on a known ring trough that receives and shapes the annulus of the winding cores, being interrupted in the region of the lacing tool. As before, the lacing tool is supposed to prepare the wires of the winding cores and also any inserted insulation, without application of strong pressing pressure during the lacing.

The invention is discussed below with reference to the drawings.

The invention can be utilized with a lacing machine of the type described, for instance, in German Pat. No. 1,203,873. Other similar lacing machines are shown in German OS Nos. 2,206,657; 2,407,557; 2,408,244; 2,437,452; and 2,637,909. What is involved here for the invention is not the lacing tools and the lacing process in particular, but rather the compression of the winding cores that are to be laced, directly during the lacing.

Figure 1:
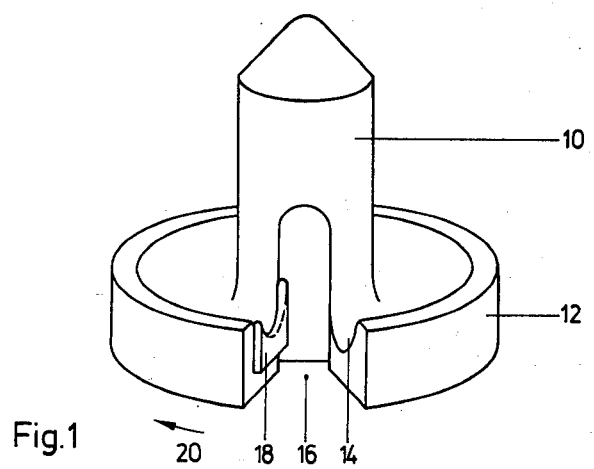
FIG. 1 is a perspective view of the essential part of the device of the invention, for shaping the winding cores that are to be laced.

The shaping tool shown in FIG. 1 is provided for this purpose. It consists in principle of a mandrel 10 that can be introduced into the hole of the stator sheet pack, this arrangement not being absolutely necessary, however, and an annular flange 12 that can be set thereon, with an annular tray 14 formed therein, in which upon introduction of mandrel 10 into the hole of the stator sheet pack, are diposed the winding cores that project unilaterally. On the opposite axial side of the stator sheet pack, there can be another shaping device 10, 12 of this kind, to allow shaping of the stator on both sides and lacing simultaneously.

Annular flange 12 has a cut 16 at one location on its periphery, penetrating through to mandrel 10, in which the lacing tool (not illustrated) operates. The latter, during the lacing, executes a stepwise turning together with shaping tool 10, 12 relative to the stator sheet pack and the annulus of the winding cores, whereby the lacing tools respectively pass into the space between the stator grooves that receive the windings, between the winding cores and the front face of the stator sheet pack, and thereby the lacing cord is pulled along and tied firmly about the winding cores by looping and knotting.

In order that the winding cores may be firmly compressed in the desired form during the lacing, shaping tool 10, 12 could be made with a suitable profiling of annular tray 14, and pressed with great force against the winding cores. The whole machine construction would have to be correspondingly heavy and expensive in its design. The invention therefore provides that the winding cores will be compressed with great pressing force only in a relatively narrow area directly next to the place at which the lacing tools work, and for this purpose, use is made of a special shaping part 18 disposed on the edge of the notch or cut 16 in annular flange 12. The arcuate profile of the shaping tool 18 that engages the winding cores has less depth and radial width than annular tray 14. In this way, shaping part 18 presses substantially more strongly than the wall of annular tray 14 against the winding cores. In turning of shaping tool 10, 12 relative to the stator sheet pack in the direction indicated by arrow 20 in FIG. 1, shaping tool 18 moves close ahead of the lacing tools and presses the winding cores directly at the lacing station in question, strongly and in the desired shape.

Figure 2:
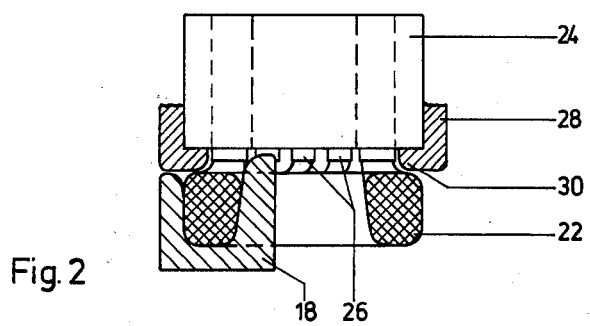
FIG. 2 is a schematic cross-section through a stator with its winding and a shaping part that compresses the winding cores next to the lacing station.

FIG. 2 shows how shaping part 18 engages winding core 22 like a U. In this way, pressure is exerted on the cores radially from inside and out, as well as axially from the outside. To prevent winding cores from being pressed flat against the front face of the stator packet 24 of FIGS. 2 and 3, where, for example, slot insulation 26 could be damaged, radial projections or tongues 30 projecting inwardly could be disposed on a retaining device 28 for the stator sheet pack on its front, consisting for example of two half shells, said projections engaging the winding cores 22 and bracing them against the shaping and compression pressure of shaping part 18 and ensuring a certain separation between the winding cores and the front face of the stator sheet pack that is needed for the orderly operation of the lacing tools.

Figure 3:
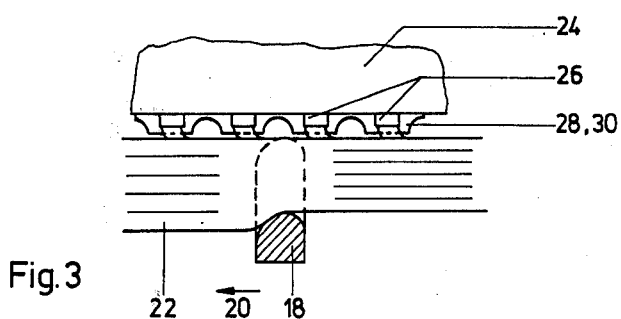
FIG. 3 is a cross-section through the shaping part shown in FIG. 2, in a sectional plane perpendicular thereto, whereby the stator sheet pack and the winding cores are shown schematically as a kind of developed projection.

FIG. 3 shows the deformation of the winding cores by shaping tool 18, in a cross-section tangential to the winding cores. To the left of shaping part 18 is the as yet unlaced part of a winding core, whereas on the right the core has already been laced and thereby remains firmly compressed.

Figure 4:
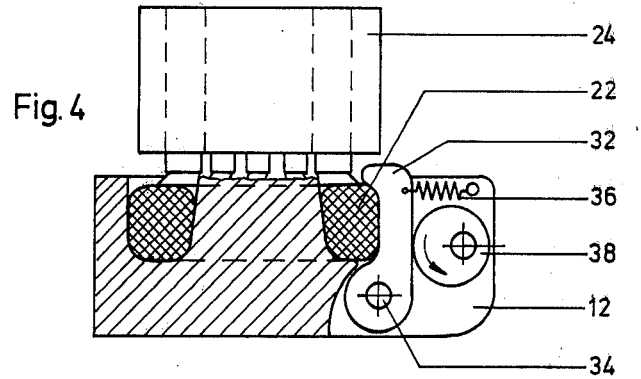
FIGS. 4 and 5 are views corresponding to FIG. 2, of two modified devices for shaping the winding cores.
Figure 5:
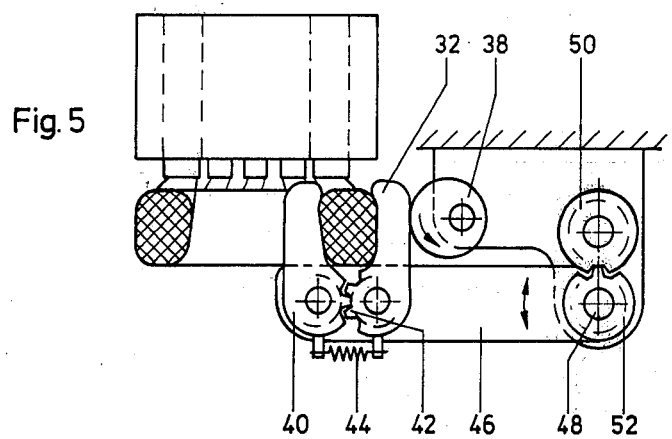
Figure 6:
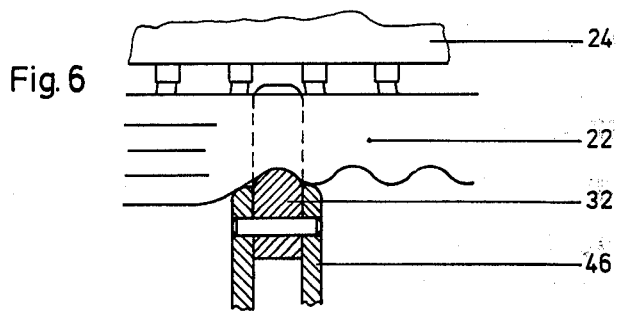
FIG. 6 is a cross-section corresponding to FIG. 3, through the shaping part shown in FIG. 5.

As FIG. 3 shows, shaping part 18 should have the gentlest possible rounded profile in the cross-sectional plane illustrated there, because with strong pressure it slides over the wires of the winding cores but must not damage them. Alternatively, therefore, shaping part 18 may be in the form of one or more rollers, or a lever, or a tong-like member. Reference is made in this connection to FIGS. 4 to 6.

According to FIG. 4, a lever 32, borne on a shaft 34 on annular flange 12 serves as shaping tool. Lever 32 is kept in constant application to the periphery of a rotationally driven cam plate 38, by a spring 36. Thereby lever 32, during the stepwise turning of shaping tool 18 relative to stator 24 will be alternatingly pressed against winding core 22 and retracted radially outward.

In the arrangement according to FIG. 4, lever 32 presses essentially radially from the outside inward against the winding core. The configuration and/or arrangement of lever 32 or other levers can be so selected however, that the pressing force exerted on the winding core and locally deforming it will act axially.

The arrangement according to FIG. 5 differs from that of FIG. 4 in that the lever 32 cooperates like tongs with another lever 40. A single cam plate 38 suffices as a drive if lever 32 and lever 40 are engaged via a toothed arrangement 42. A spring 44 tensioned between the two serves to release the tongs grip of levers 32 and 40. The levers act radially from the inside and outside on winding core 22. Depending upon the configuration and arrangement of the levers, there may also be exertion of an axial pressing force, at the same time as the radial pressing force.

A special device is provided according to FIG. 5 to obtain an axial deformation of winding core 22. Levers 32, 40 are not borne on annular flange 12, but on a retaining device 46 that is axially swingable with reference to the stator axis, said device 46 in turn being borne on a pivot pin 48 and swingable in the direction indicated by the arrow by the drive coupled with the drive of cam plate 38, acting via gears 50, 52. With this kind of shaping device, winding core 22 receives the corrugated surface shown in FIG. 6.

Other modifications of the shaping tool are possible within the scope of the invention. In one modification the device 46 could swing against the winding core only once and keep this position while the levers 32, 40 alternatively press and open during the forming and lacing process.

What is claimed is:

1. In a process for shaping the winding head of a stator or rotor of an electrical machine, the improvement wherein shaping forces are applied to the winding head to provide shaping thereof and the winding head is laced simultaneously with said shaping and wherein said shaping is effected by using the same forming tool part to progressively contact and shape discrete areas of the winding head in sequence around the circumference thereof.

2. A process as in claim 1, wherein the winding head is only shaped locally during the progressive shaping of the winding head around the circumference thereof and this local shaping takes place in proximity to the location at which the lacing step takes place.

3. A process as in claim 1, wherein each phase of the progressive shaping of the winding head is limited to a location on the winding head which is in proximity to and lies upstream of that at which lacing takes place.

4. A process as in claim 1, wherein the winding heads are successively shaped both radially and axially.

5. A process as in claim 1, wherein the winding heads are shaped in two or more immediately succeeding stages, to a predetermined state.

6. A process as in claim 1, wherein the shaping pressure is exerted continuously during the progressive shaping of the head around the circumference thereof.

7. A process as in claim 1, wherein the shaping pressure is exerted intermittently.

* * * * *